United States Patent Office 3,448,152
Patented June 3, 1969

3,448,152
AMINE RECOVERY
John G. Milligan and Thomas H. Cour, Austin, Tex., assignors to Jefferson Chemical Company, Inc., Houston, Tex.
No Drawing. Filed Nov. 3, 1966, Ser. No. 591,718
Int. Cl. C07c 87/04, 87/16, 87/10
U.S. Cl. 260—583                                7 Claims

ABSTRACT OF THE DISCLOSURE

Amines are recovered in a process wherein ethylene dichloride is reacted with ammonia and the mixture is stripped of unreacted ammonia. Sodium hydroxide equivalent to the chloride present is added to the mixture, a solvent is added, water is removed by distillation, the sodium chloride is removed by filtration or centrifugation and the solvent and amine products are separated by a suitable means, such as azeotropic distillation or solvent extraction.

---

This invention is concerned with the recovery of ethylene amines. More particularly this invention is concerned with the recovery of ethylene amines prepared by the reaction of ethylene dichloride with ammonia.

It is well known to prepare ethylenediamine and its higher homologues by the reaction of ethylene dichloride with ammonia. At times, the demand for the higher homologues, such as diethylenetriamine, triethylenetetramine and tetraethylenepentamine, is greater than the demand for ethylenediamine. Consequently, it is important to minimize losses of the higher homologues from the process.

When ammonia is reacted with ethylene dichloride, hydrogen chloride is a by-product of the reaction. This hydrogen chloride immediately reacts with the amines to form the amine hydrochlorides and it is necessary to regenerate the amines from the hydrochlorides. This is generally done by neutralization of the crude reaction mixture with sodium hydroxide. This results in the formation of large amounts of sodium chloride which must be separated from the amines. Heretofore, the amines have commonly been recovered after the neutralization step by a steam stripping operation. This steam stripping operation suffers from two disadvantages. There is a heavy loss of the higher homologues in the sodium chloride residue and the overhead contains a high percentage of water and must be dried by tedious means.

We have now discovered a process for recovery of the amines whereby all the salt is removed and the recovery of amines is high. It is to be understood that unreacted sodium hydroxide is removed with the salt. In accordance with our process the mixture from the reaction of ethylene dichloride with ammonia is stripped of unreacted ammonia, sodium hydroxide equivalent to the chloride present is added, a solvent as described hereinbelow is added, water is removed by distillation, the sodium chloride is removed by filtration or centrifugation and the solvent and amine products are separated by any suitable means, such as azeotropic distillation or solvent extraction. The presence of solvent during removal of the water after neutralization results in easier filtration of the salt precipitate and maintains the amine products in solution to prevent their loss with the salt cake.

The solvent to be used in our process must be a solvent for the amine, a non-solvent for sodium chloride and sodium hydroxide and be essentially immiscible with water. While solvents boiling below water, such as benzene, may be employed, best results are obtained using a solvent that has a boiling point above that of water. Preferred solvents for the process are aromatic hydrocarbons boiling above water such as, for example, toluene, the xylenes, ethylbenzene and diisopropylbenzene. The xylenes and ethylbenzene are particularly preferred solvents for our process. For reasons of economy, a mixture of xylene isomers is generally used; however, the pure isomers may also be used. Other organic solvents meeting the solubility and the boiling point requirements may also be employed. Suitable solvents are, for example, the higher aliphatic alcohols, such as n-decyl alcohol. The amount of solvent employed will vary depending upon the particular solvent chosen. Sufficient solvent should be used to dissolve all the amine products present and form a mobile and easily handled slurry with the salt; however, large excesses of solvent should be avoided since excesses complicate the recovery of the amines. The solubility of the amines in any particular solvent and the mobility of the slurry formed after removal of water can be determined by routine experimentation and on this basis the amount of solvent necessary can be determined. For example, when xylene is used as the solvent we have found it convenient to add sufficient solvent so that the resulting slurry contains about 25% salt.

Our process may be used no matter what the conditions for the reaction of ethylene dichloride with ammonia or the conditions for neutralization. If the resultant mixture contains the ethylene amines, water and salt, our process offers a convenient and efficient method of recovering the ethylene amines product. In accordance with our process a solvent as described hereinabove is added to the mixture of amine, water and salt and the water is then removed by distillation. If the solvent is one which forms an azeotrope with water, the water may be azeotropically removed and the solvent returned to the mixture. After removal of the water there remains a two-phase system consisting of a solution of the amine in the solvent and a solid salt phase. The salt may be separated from the solution by any convenient means, such as filtration, decantation or centrifugation. While only small amounts of the amine remain with the salt cake, amine losses may be reduced even further by washing the salt cake with fresh solvent. The washings are then added to the amine solution.

Recovery of the amine from the solution may be accomplished by any one of a number of known procedures. For example, separation may be accomplished by a fractional distillation; however, this procedure is not always entirely satisfactory because of the close boiling points of the solvent and certain of the amine products. It is also possible to azeotropically remove the solvent from the amines by continuous addition of water and azeotropic distillation. If the proper amount of water is added, a dry product remains. This dry product can then be distilled to recover the amines. A third, and the generally preferred, method of recovering the amines is by extracting them from the solvent with water. The amines can then be azeotropically dried and distilled.

Our process will be further illustrated by the following examples.

EXAMPLE I

Ethylene dichloride was reacted with aqueous ammonia in a tubular reactor at an ammonia to ethylene dichloride mol ratio of 15:1. Unreacted ammonia was stripped from the reactor effluent batchwise at atmospheric pressure until a reflux temperature of 98°–100° C. was reached. To a 22-liter 3-neck flask fitted with a stirrer, a thermometer, a reflux condenser and an addition funnel was charged 12,000 grams of the stripped reactor effluent. To this effluent was added 4,941 grams of 50% caustic soda solution, and the mixture was heated until a reflux temperature of about 98° C., was obtained to strip off the remaining ammonia. After the ammonia stripping was complete the pot was fitted with a short column, a condenser and a modified Dean-Stark trap. To the pot was added 5,000 grams of xylene (a commercially available mixture containing 13.2% ethylbenzene, 11.3% p-xylene, 61.3% m-xylene and 14.2% o-xylene) and water was removed by azeotropic distillation in the Dean-Stark trap and xylene was returned to the column. When essentially all of the water had been removed from the system, the pot contained the xylene solution of ethylene amines and a precipitate comprised of sodium chloride and any unreacted sodium hydroxide that might be present. At this point the contents of the pot were cooled to 50°–60° C. and the crystalline phase was removed by filtration. The salt cake was washed with 2,363 grams of fresh xylene to separate occluded ethylene amines from the salt.

The water phase separated from the xylene in the Dean-Stark trap contained 5.9% ethylenediamine. The washed salt cake contained 0.3% nitrogen (0.8% amines). This loss was calculated to be 2.3% of the total amine production.

The original filtrate and the salt washing were combined and charged to a 12-liter pot fitted with a 1″ laboratory column 2′ high packed with stainless steel Goodloe packing. The column was equipped with a special head which facilitated removal of the upper layer and return of the lower layer during a heterogeneous azeotropic distillation. About 150 grams of water was added to the still pot and the xylene was removed azeotropically. After the xylene was removed from the system, the pot contained ethylene amines products which were separated by conventional methods of distillation. Similarly, the ethylenediamine contained in the original water phase can be recovered from the water by fractional distillation and a benzene drying operation.

EXAMPLE II

To 300 grams of partially stripped reaction mixture (from ethylene dichloride and ammonia) was added 115 grams of 50% sodium hydroxide solution to convert the amine hydrochlorides to the free amines and sodium chloride, and 100 grams of xylene was then added. This mixture was heated in a 1-liter 3-neck flask fitted with a stirrer, a thermometer and a Dean-Stark trap. The trap removed the water from the distillate and returned the xylene to the still pot. After the water was removed, the sodium chloride crystals were separated from the solution of the amines in xylene by filtration. To the filtrate was added water and the mixture was distilled to remove the water-xylene azeotrope. More water was added as needed to remove the xylene without allowing the head temperature to go above 110° C. After removal of the xylene-water azeotrope the remaining ethylene amines were distilled.

EXAMPLE III

This example illustrates the efficiency of extracting the amines from the xylene solution with water after filtration of salt from the mixture. The procedure of Example II was followed through the point where the sodium chloride was removed from the xylene solution of the amines by filtration. The filtrate had the following composition: 92.5% xylene, 0.05% ethylenediamine, 0.14% piperazine, 2.61% diethylenetriamine, 0.6% aminoethylpiperazine, 1.56% triethylenetetraamine, 1.13% tetraethylenepentamine, 1.04% pentaethylenehexamine and 0.36% amine residue. This solution was contacted in a separatory funnel with a solution containing 5–6% ethylenediamine and 94–95% water. The mixture was shaken in the separatory funnel, the phases were allowed to separate and the xylene phase was analyzed for amine content. The test showed that the xylene phase contained less than 0.05% total amine calculated as ethylenediamine after contact with the water rich solution. The water could then be removed from the aqueous amine solution by azeotropic drying and the amines recovered by distillation.

EXAMPLE IV

Example III was repeated using diisopropylbenzene instead of xylene.

EXAMPLE V

This example was also run in the same manner as Example III but n-decyl alcohol was used in place of the xylene.

Having thus described our invention, we claim:

1. In a method for the preparation of ethylene amines by the reaction of ethylene dichloride with ammonia followed by neutralization with sodium hydroxide, the improvement for facilitating recovery of the amines and removal of salt which comprises adding an organic solvent to the neutralized reaction mixture, distilling the water from the mixture to leave a solid salt precipitate and a solution of ethylene amines in said organic solution and recovering the amine products from the solution, said organic solvent being essentially immiscible with water, is a solvent for the ethylene amines and nonsolvent for the salt and sodium hydroxide, and has a boiling point above the boiling point of water.

2. A method as in claim 1 wherein the organic solvent is an alkylated benzene having a boiling point within the range of about 110° C. to above 200° C. and mixtures thereof.

3. A method as in claim 2 wherein the solvent is xylene or a xylene mixture.

4. A method of claim 2 wherein the solvent is ethylbenzene.

5. A method as in claim 2 wherein the ethylene amines are recovered from the alkylated benzene solvent by extracting said amines from the solvent solution with water, azeotropically drying the aqueous amine solution and distilling the dried amines.

6. A method as in claim 5 wherein the solvent is xylene or a xylene mixture.

7. A method as in claim 5 wherein the solvent is ethylbenzene.

References Cited

UNITED STATES PATENTS 2,802,030  8/1957  Ashby.

CHARLES B. PARKER, *Primary Examiner.*

R. L. RAYMOND, *Assistant Examiner.*

U.S. Cl. X.R.

203—96; 260—585